March 23, 1965

H. W. CONIBEAR 3,174,758

MEASURING DEVICE FOR FERTILIZER SPREADER

Filed Dec. 11, 1962

Henry W. Conibear
INVENTOR.

BY
Attorneys

March 23, 1965   H. W. CONIBEAR   3,174,758
MEASURING DEVICE FOR FERTILIZER SPREADER
Filed Dec. 11, 1962   4 Sheets-Sheet 2

Henry W. Conibear
INVENTOR.

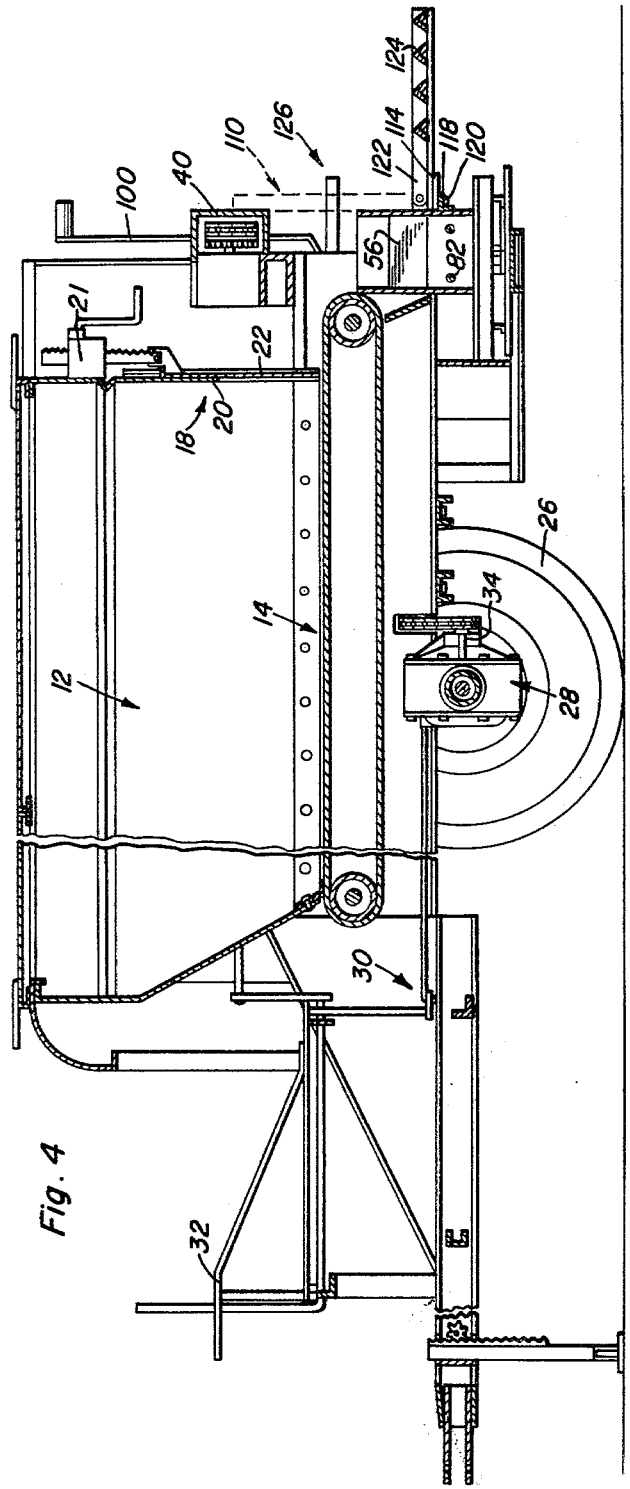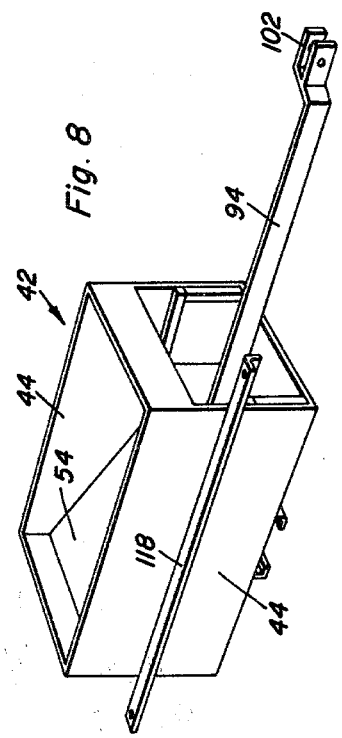
Henry W. Conibear
INVENTOR.

March 23, 1965 H. W. CONIBEAR 3,174,758
MEASURING DEVICE FOR FERTILIZER SPREADER
Filed Dec. 11, 1962 4 Sheets-Sheet 4
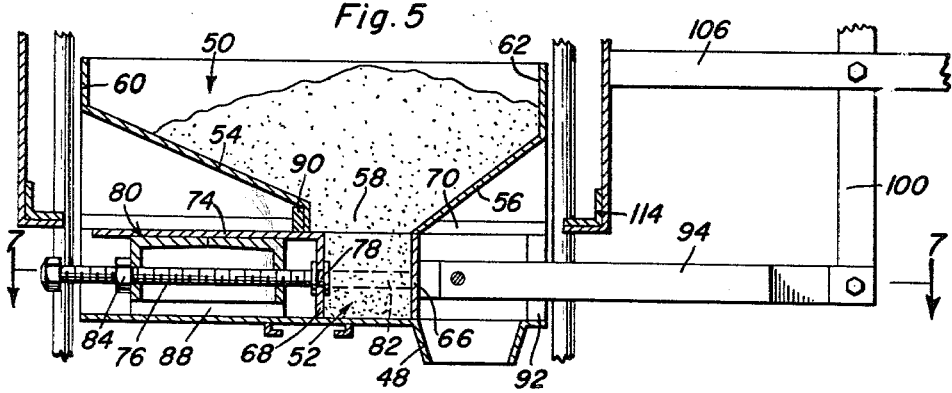
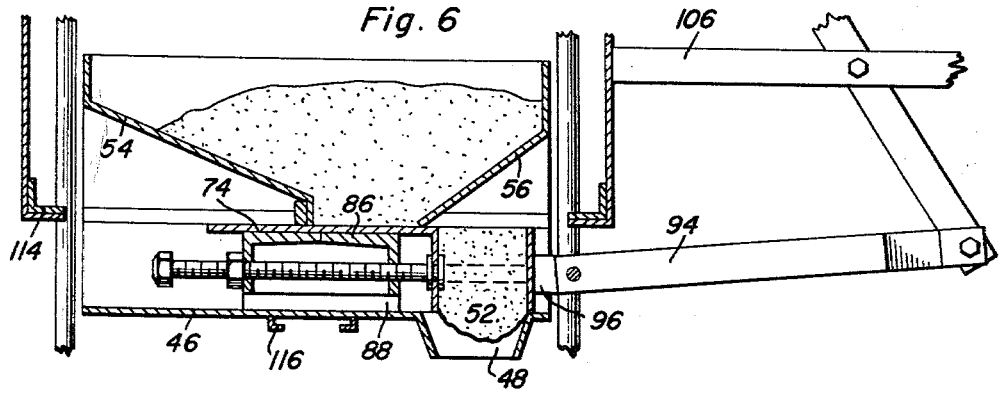
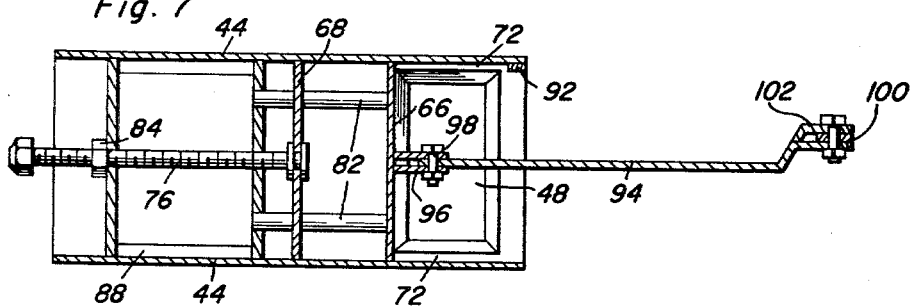
Henry W. Conibear
INVENTOR.
BY
Attorneys

United States Patent Office 3,174,758
Patented Mar. 23, 1965

3,174,758
MEASURING DEVICE FOR FERTILIZER SPREADER
Henry W. Conibear, P.O. Box 376, Lakeland, Fla.
Filed Dec. 11, 1962, Ser. No. 243,797
6 Claims. (Cl. 275—8)

The present invention generally relates to a device for enabling the selective spreading of a predetermined amount of fertilizer, and more particularly to a device constituting an attachment for the fertilizer spreader disclosed in applicant's application Serial No. 19,633, now Patent No. 3,075,777, issued January 29, 1963.

In the fertilization of young trees, it is essential that the proper amount of fertilizer be applied to each tree thus requiring a much greater control of the spreading of the fertilizer than is generally considered proper for older trees for which a general over-all spreading of the fertilizer is deemed sufficient. Further, inasmuch as small trees must be spaced apart a sufficient distance so as to allow for growth, a general spreading of fertilizer over the entire area would result in a major portion of the fertilizer being spread where no benefit from it would accrue to the small trees.

Accordingly, one of the primary objects of the present invention is to provide an attachment for spreaders of the type wherein the fertilizer is deposited on one or more spreading or broadcasting plates, the attachment being positioned so as to intercept the flow of fertilizer to the broadcast plates and act as a retainer for a predetermined amount of fertilizer, this predetermined amount of fertilizer being selectively released and introduced onto a broadcast plate for the spreading thereof only in the immediate vicinity desired.

It is also a significant object of the present invention to provide a device which will result in a substantial saving in both time and labor over the conventional manner of selectively fertilizing young trees by men walking along the tree rows and spreading the fertilizer with buckets. This will particularly be the case on large plantings of from fifty to one thousand acres of young trees planted from fifty to ninety trees per acre.

Likewise, it is an object of the present invention to provide that the attachment be adjustable so as to allow for the selective dispensing of varying amounts of fertilizer, approximately from one-quarter pound to five pounds at the option of the user of the device and in accordance with the requirements of the particular type of tree being fertilized.

Likewise, it is also intended that the attachment comprising the present invention both be simple in construction and efficient in operation.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

FIGURE 4 is a longitudinal cross-sectional view taken substantially on a plane passing along line 4—4 in FIGURE 2;

FIGURE 5 is a sectional view through the measuring attachment illustrating the measuring chamber in its fertilizer receiving position;

FIGURE 6 is a view similar to FIGURE 5 however illustrating the fertilizer measuring chamber in its discharging position;

FIGURE 7 is a cross-sectional view taken substantially on a plane passing along line 7—7 in FIGURE 5; and FIGURE 8 is a perspective view of the measuring device.

Figure 1:
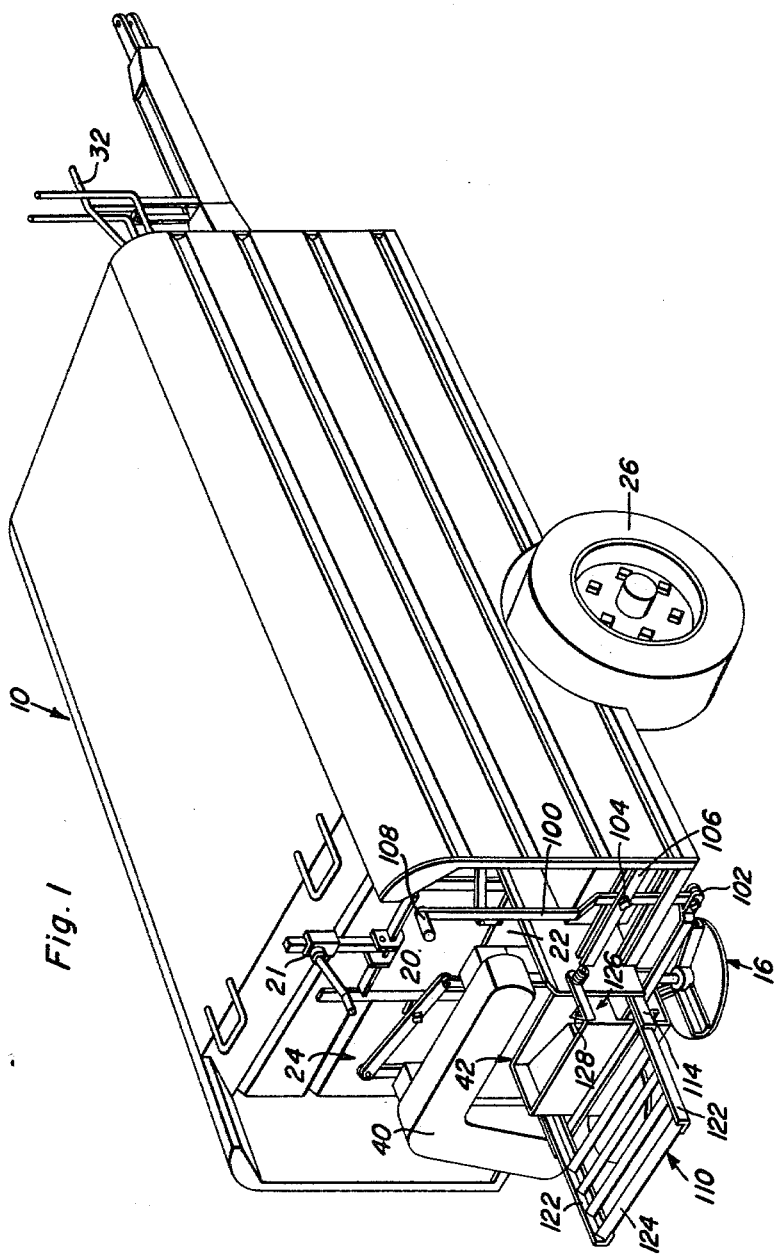
FIGURE 1 is a perspective view of the rear end of the fertilizer spreader with the measuring attachment comprising the present invention mounted thereon.
Figure 2:
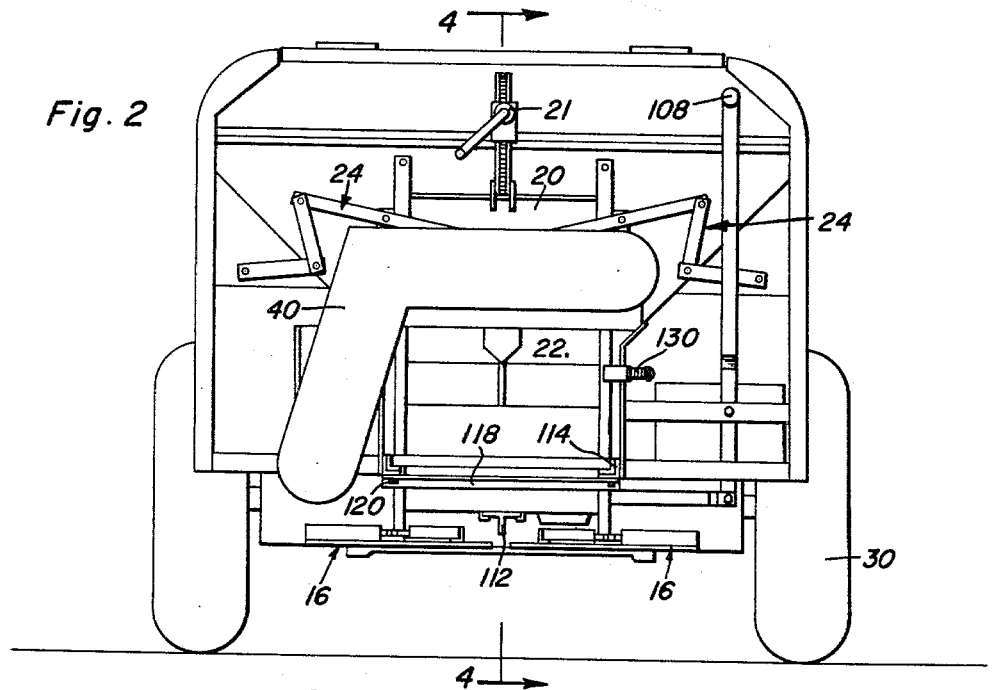
FIGURE 2 is a rear elevational view of the spreader.
Figure 3:
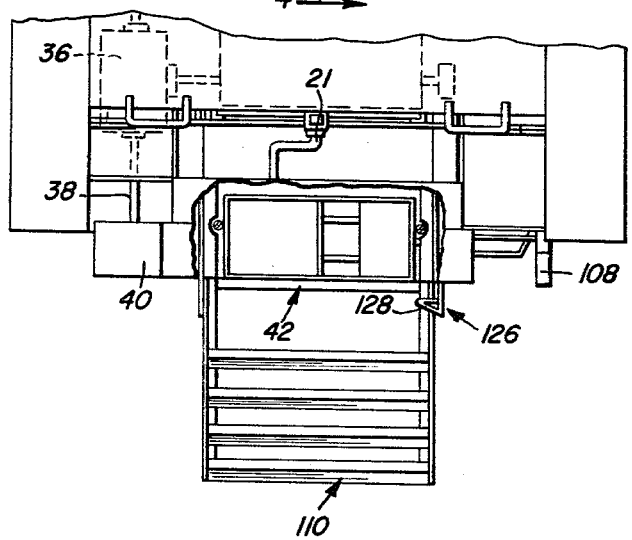
FIGURE 3 is a top plan view of the rear end of the spreader with portions broken away so as to show the attachment.

Referring now more specifically to the drawings, reference numeral 10 generally designates a mobile fertilizer spreader of the type illustrated in application Serial No. 19,633. This spreader 10 consists basically of an enlarged hopper 12 for the fertilizer which is to be distributed, an endless conveyor 14 in communication with the bottom of the hopper 12 for conveying the fertilizer rearwardly out the open rear end of the hopper 12 for discharge on distributing plates or fans 16, and a gate system 18 on the rear of the hopper for regulating the size of the opening through which the fertilizer is dispensed by the conveyor 14. This gate system consists of a main control gate 20 vertically adjustable by suitable means such as the rack and pinion 21 illustrated in the drawings, and a pair of smaller gates 22 each adjustable through suitable linkages 24, the main gate 20 controlling the flow of fertilizer over the entire width of the conveyor 14 and the smaller gates 22 each controlling the flow of material over one-half of the conveyor belt 14.

The spreader 10 is supported on a pair of supporting wheels 26 interconnected by a two-speed rear truck axle 28 which is controlled, through suitable shift rods 30, by means of a handle 32 on the forward end of the spreader. An output shaft 34 is provided on the axle 28 and, through suitable transfer means and a reduction unit 36 drives the conveyor 14. The gear reduction unit 36 also includes an output shaft 38 for, through suitable gears and chains being positioned within a housing 40, driving the depending distributing fans 16. All of the foregoing structure is substantially the same as shown and described in applicant's copending application No. 19,633.

The invention in the instant case consists of a novel measuring device 42 and the use of such a device as an attachment on and in combination with the above described fertilizer spreader structure. The measuring device 42 includes two vertically extending elongated sides 44, a bottom 46, a downwardly extending discharge spout 48 formed through the bottom 46 at one end of the device 42, an upper enlarged receiving chamber 50 and a lower movable measuring chamber 52. The upper receiving chamber 50, of a width so as to correspond to the width of the conveyor 14 for the reception of the fertilizer discharged therefrom, is formed by, in addition to the side walls 44, two inwardly and downwardly sloping bottom walls 54 and 56 terminating in spaced relation to each other so as to form a discharge mouth 58, the chamber 50 acting in the manner of a funnel so as to direct the fertilizer received therein to the mouth 58. It will be noted that vertical end walls 60 and 62 are also provided on the upper chamber 50.

The lower movable measuring chamber 52 consists of a front wall 66 extending transversely between and slidable relative to the side walls 44, and a rear wall 68 similarly extending between the side walls 44 and being both adjustable relative to the front wall and movable with the front wall. Both the front wall 66 and the rear wall 68 are of a height so as to extend upwardly from the bottom wall 46 to the discharge mouth 58, suitable guide strips 70 being provided on each side wall 44 for guiding the measuring chamber 52 during longitudinal movement from a first position wherein the feritlizer is received from the discharging mouth 58 to a second position wherein the received fertilizer is discharged through the spout 48. It will be noted that flat portions or shoulders 72 are provided along each edge of the spout 48 so as to allow the measuring chamber 52 to guide smoothly thereover. In order to prevent flow of the fertilizer through the mouth 58 while the measuring chamber 52 is discharging through the spout 48, an integrally formed rearwardly extending flange 74 is provided along the top edge of the rear wall 68, this top flange 74 sealing the mouth 58 as the chamber 52 is moved to its discharging position with the mouth 58 remaining sealed until the measuring chamber is returned to its original position.

The adjustment of the rear wall 68 relative to the front wall 66 is effected by means of an elongated adjusting bolt 76, the forward end of which is rotatably secured to the rear wall 68 as at 78. The adjusting bolt 76 is mounted within aligned apertures in a bracing unit 80 slidably mounted to the rear of the measuring chamber 52 and fixedly secured to the front wall 66 by two elongated smooth rods 82, these rods 82 extending through apertures in the rear wall 68 and acting so as to guide this rear wall 68 during the movement thereof by the adjusting bolt 76. It will be noted that an internally threaded nut 84 is rigidly secured to the bracing member 80 in line with the rearmost aperture, this nut 84 threadedly receiving the adjusting bolt 76 whereby longitudinal movement of the rear wall 68 will be produced by a rotation of the bolt 76. While not specifically limited thereto, it will be noted that the bracing member 80 has been illustrated as consisting of two angle members 86 oriented with their horizontal legs abutting and welded together and with the lower ends of the vertical legs rigidly affixed to the upper surface of longitudinally extending rectangular bars 88 which allow for a smooth longitudinal movement of the bracing member 80 on the bottom wall 46. Further, if so desired, a transversely extending seal 90 can be provided adjacent the discharge mouth 58 so as to avoid a leakage of the fertilizer upon a return of the measuring chamber 52. Likewise, a stop 92 can be provided so as to limit forward movement of the chamber 52 and facilitate the positioning of the chamber directly over the discharge spout 48.

Movement of the measuring chamber 52 from a fertilizer receiving position as illustrated in FIGURE 5 to a fertilizer discharging position as illustrated in FIGURE 6, is effected by means of an elongated link 94 pivotally secured to two forwardly projecting ears 96 on the front wall 66 by bolt means 98. Upon a mounting of the measuring device on the rear of the fertilizer spreader 10, in a manner which shall be gone into presently, an elongated upright lever 100 is used for effecting the desired movement of the link 94 and measuring chamber 52, this lever 100 being pivotally secured at its lower end between the bifurcated outer end 102 of the link 94 and pivotally mounted, as indicated by reference numeral 104 to a framing member 106 of the spreader 10, a handle 108 being provided at the upper end of the lever 100 so as to enable a user of the device, standing on the platform 110, to conveniently control the measured dispensing of the fertilizer.

Referring now to the manner in which the measuring device 42 is mounted on the spreader 10, it will be noted that the framework of the spreader 10 includes a rearwardly projecting T-shaped member 112 and two rearwardly projecting inwardly facing angle members 114 located above and to each side of the T-shaped member 112. The measuring device 42 has two depending transversely extending spaced members 116, each including inwardly directed flanges so as to form opposed grooves for the reception of the outer ends of the T-shaped beam 112, thus mounting the measuring device 42 on and juxtaposed the discharge end of the conveyor as shown in FIGURE 4, the fertilizer being discharged from the conveyor directly into the upper receiving chamber 50. In addition, the measuring device 42 is also provided with a longitudinally extending angle member 118 which projects beyond both ends thereof, these ends, upon the mounting of the measuring device 42 on the T-shaped beam 112, being positioned beneath and juxtaposed to the undersurface of the outwardly extending angle members 114. In order to maintain the measuring device 42 properly oriented on the rear of the fertilizer spreader 10, suitable fastening means 120 are inserted through aligned apertures in the overlapped angle members 114 and 118.

In addition to the measuring device 42 in combination with the spreader 10, the present invention also contemplates the provision of an operator's platform 110, this platform consisting of two elongated side angle members 122 and a plurality of transversely extending angle members 124, the angle members being oriented with their apex upwardly so as to provide a non-slip standing surface. The inner ends of the side angle members 122 are nested within and pivotally secured to the angle members 114 at a point spaced inwardly of the outer ends thereof whereby the platform 110 will be maintained in a rigid horizontal orientation, the downward pivoting movement of the platform being limited by the outer ends of the angle members 114 as best seen in FIGURE 4. FIGURE 4 is also of significance for its showing, in phantom lines, of the vertical position to which the platform 110 is moved during periods of non-use, the platform being maintained in this vertical position by an inwardly biased retaining lug 126 including an angled outer face 128 so as to allow the platform to force the retaining member 126 outwardly during the upward movement thereof until the platform has passed beyond the retaining member at which point the retaining member returns, under the biasing force of the spring 130, to its original position so as to prevent outward movement of the platform 110 to its horizontal position until a subsequent outward movement of the retaining member 126.

In operation, the hopper 12 is loaded with fertilizer and the spreader 10 proceeds along a row of trees with the rotation of the wheels 26 causing a rearward carrying of the fertilizer by the conveyor 14 and a simultaneous rotation of the broadcast plate or plates 16. The amount of fertilizer allowed to pass through the rear of the hopper 12 is regulated by the control gate means 18 and, upon passing through the gate means, is received in the upper enlarged funnel-shaped receiving chamber 50 of the measuring device 42, a portion of this fertilizer then passing through the mouth 58 into the measuring chamber 52 which has previously been adjusted so as to contain a specific amount of fertilizer. As the spreader 10 reaches a point in relation to a young tree whereby the broadcast plate 56 will produce the desired spread of fertilizer, the operator standing on the platform 110 moves the handle 108 so as to affect a movement of the measuring chamber 52 to its discharge position over the spout 48 at which time the predetermined amount of fertilizer is deposited on the subjacent broadcast plate 16 and spread. It will of course be appreciated that while two broadcast plates or fans 16 are provided on the spreaders 10, the measured amount of fertilizer is dropped solely on the right hand plate for distribution to a tree positioned to the right. It will also be appreciated that by regulating the amount of fertilizer introduced into the receiving chamber from the hopper, the spreader 10 can continually move forward at a steady rate with the measured amount of fertilizer being selectively discharged only when required, the operator positioned directly over the dispersing fan allowing an accurate gauging of the most appropriate time to effect the measured discharge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and

What is claimed as new is as follows:

1. In combination, a mobile fertilizer spreading device and a measuring attachment therefor; said spreading device including a fertilizer containing hopper, a gate regulated opening in said hopper, means without said hopper for moving the fertilizer through said opening, a fertilizer distributing plate located in spaced relation below said opening, and a structural beam located above the distributing plate to one side of the center thereof and below the opening; said measuring attachment including means for releasably mounting the attachment on said beam below said opening and above the distributing plate, an enlarged chamber for receiving fertilizer directly from the hopper opening, said chamber including downwardly and inwardly sloping walls terminating in a discharge mouth, a discharge spout located in spaced relation below and completely to one side of said mouth and directly above the distributing plate, a movable measuring chamber located between the discharge mouth and the discharge spout and selectively solely communicated with first the discharge mouth and then the discharge spout for moving a predetermined amount of fertilizer from the enlarged chamber to the distributing plate.

2. The combination of claim 1 including manual means for controlling movement of the measuring chamber, a platform, said platform being located adjacent said measuring attachment, and means mounting said platform on said spreading device for movement between an operative position projecting horizontally outward from the spreading device and an inoperative vertical position juxtaposed said spreading device.

3. The combination of claim 2 including means releasably retaining said platform in said inoperative position.

4. The combination of claim 1 wherein said measuring attachment sits freely on the upper surface of said beam, said means mounting said attachment on the beam including elements engaging the opposite sides of said beam in a manner so as to allow longitudinal movement of the attachment on the beam while preventing lateral movement, a pair of structural members on the spreading device, one structural member being located in spaced parallel relation to said beam on each side thereof, and a transverse bar fixed to the attachment and projecting laterally beyond both sides thereof, the projecting portions of the bar overlapping said structural members, and means releasably securing said bar to said structural members.

5. The combination of claim 4 including manual means for controlling movement of the measuring chamber, a platform, said platform being located adjacent said measuring attachment and means mounting said platform on said spreading device for movement between an operative position projecting horizontally outward from the spreading device and an inoperative vertical position juxtaposed said spreading device.

6. The combination of claim 5 wherein said means mounting the platform includes projecting side members on the platform, the projecting portions of the side members overlying the structural members, and means pivotally securing the projecting portions of the side members to the structural members.

References Cited by the Examiner
UNITED STATES PATENTS

| | | | |
|---|---|---|---|
| 1,245,250 | 11/17 | McGee | 275—2 |
| 1,304,321 | 5/19 | Julien | 275—2 |
| 2,080,311 | 5/37 | Henley | 222—308 |
| 2,526,081 | 10/50 | Meincke | 275—8 |
| 3,075,777 | 1/63 | Conibear | 275—2 |
| 3,085,807 | 4/63 | Tyler | 275—8 |

T. GRAHAM CRAVER, *Primary Examiner.*
ABRAHAM G. STONE, *Examiner.*